US011990715B2

(12) United States Patent
Manteiga et al.

(10) Patent No.: US 11,990,715 B2
(45) Date of Patent: May 21, 2024

(54) SELF-ALIGNING RADIO FREQUENCY CONNECTOR

(71) Applicant: Raytheon Company, Waltham, MA (US)

(72) Inventors: Caroline Manteiga, North Andover, MA (US); Todd E. Southard, Bolton, MA (US); Dennis W. Mercier, Hudson, MA (US); Dennis Proulx, North Grosvenor Dale, CT (US); Noah Goldberg, Wellesley, MA (US)

(73) Assignee: Raytheon Company, Tewksbury, MA (US)

( * ) Notice: Subject to any disclaimer, the term of this patent is extended or adjusted under 35 U.S.C. 154(b) by 500 days.

(21) Appl. No.: 17/119,988

(22) Filed: Dec. 11, 2020

(65) Prior Publication Data

US 2022/0190530 A1 Jun. 16, 2022

(51) Int. Cl.
*H01R 24/40* (2011.01)
*H01R 13/631* (2006.01)

(52) U.S. Cl.
CPC ......... *H01R 24/40* (2013.01); *H01R 13/6315* (2013.01)

(58) Field of Classification Search
CPC .... H01R 13/15; H01R 13/17; H01R 13/6315; H01R 24/40
USPC ................ 439/246, 247, 252, 843, 272, 273
See application file for complete search history.

(56) References Cited

U.S. PATENT DOCUMENTS 3,649,787 A * 3/1972 Kasabian ............. H01H 35/144 200/80 R
4,697,859 A * 10/1987 Fisher, Jr. .......... H01R 13/6315 439/246
4,929,188 A * 5/1990 Lionetto ................ H01R 13/17 439/607.22
5,329,262 A * 7/1994 Fisher, Jr. ............. H01R 24/44 333/260

(Continued)

FOREIGN PATENT DOCUMENTS

CN 103378429 A 10/2013

OTHER PUBLICATIONS

International Search Report for International Application No. PCT/US2021/054023 dated Jan. 25, 2022, 15 pages.

(Continued)

*Primary Examiner* — Marcus E Harcum

(57) ABSTRACT

The present disclosure sets forth a rigid, self-aligning radio frequency ("RF") connector comprising a rigid body with a first connection end and a second connection end opposite the first connection end. The RF connector can also comprise a recess disposed on an outer surface of the rigid body between the first and second connection ends, and a collapsible connector support that can comprise a connection portion and a collapsible portion. The collapsible connector support can be disposed within and protrude from the recess while also being configured to collapse into the recess. The collapsible connector support can also be configured to interface with an interfacing surface to facilitate generation of a reaction force sufficient to support the RF connector in an offset position relative to the interfacing surface and to nominally align the RF connector with a device to be connected.

26 Claims, 3 Drawing Sheets

(56) References Cited

U.S. PATENT DOCUMENTS

| | | | | | |
|---|---|---|---|---|---|
| 5,516,303 | A * | 5/1996 | Yohn | H01R 13/6315 | 439/248 |
| 5,641,294 | A * | 6/1997 | Beard | H01R 13/746 | 439/247 |
| 5,769,652 | A * | 6/1998 | Wider | H01R 24/50 | 439/63 |
| 5,918,471 | A * | 7/1999 | Mangano | F25B 9/02 | 62/51.2 |
| 5,951,337 | A * | 9/1999 | Brake | H01R 24/28 | 439/825 |
| 6,558,177 | B2 * | 5/2003 | Havener | H01R 24/50 | 439/246 |
| 7,077,697 | B2 * | 7/2006 | Kooiman | H01R 13/743 | 439/247 |
| 7,309,247 | B1 | 12/2007 | Keating | | |
| 7,416,418 | B2 * | 8/2008 | Berthet | H01R 12/91 | 439/63 |
| 7,507,114 | B2 * | 3/2009 | Kent | H01R 13/5224 | 439/174 |
| 7,510,433 | B2 * | 3/2009 | Blakborn | H01R 13/5221 | 439/272 |
| 7,682,206 | B2 * | 3/2010 | Kainz | H01R 13/2421 | 439/700 |
| 7,758,367 | B2 * | 7/2010 | Siebens | H01R 13/631 | 439/271 |
| 7,857,669 | B1 * | 12/2010 | Wavering | H01R 13/2421 | 439/246 |
| 7,955,143 | B2 * | 6/2011 | Zhang | H01R 13/17 | 439/825 |
| 8,162,672 | B2 * | 4/2012 | Huang | H01R 13/11 | 439/63 |
| 8,251,725 | B2 * | 8/2012 | Kasparian | H01R 13/187 | 439/252 |
| 8,636,529 | B2 * | 1/2014 | Stein | H01R 13/6315 | 439/252 |
| 9,281,641 | B2 | 3/2016 | Baechle et al. | | |
| 9,512,921 | B2 | 12/2016 | Zagroun et al. | | |
| 9,762,007 | B2 * | 9/2017 | Erdos | H01R 24/38 | |
| 9,979,128 | B2 | 5/2018 | Zieman | | |
| 10,516,224 | B1 * | 12/2019 | Taylor | H05K 1/0243 | |
| 10,566,715 | B2 * | 2/2020 | Pandya | H01R 13/114 | |
| 10,826,230 | B1 * | 11/2020 | Goebel | H01R 43/26 | |
| 11,025,008 | B2 * | 6/2021 | Kim | H01R 13/052 | |
| 11,146,001 | B2 * | 10/2021 | Endo | H01R 43/16 | |
| 2014/0120757 | A1 * | 5/2014 | Purdy | H01R 24/40 | 439/322 |
| 2014/0273574 | A1 * | 9/2014 | Sandhu | G01R 3/00 | 29/874 |
| 2015/0024627 | A1 * | 1/2015 | Wei | H01R 24/40 | 439/583 |
| 2015/0050824 | A1 * | 2/2015 | Blakborn | H01R 13/6315 | 439/252 |
| 2015/0180150 | A1 * | 6/2015 | Shinder-Lerner | H01R 24/50 | 439/252 |
| 2016/0036161 | A1 * | 2/2016 | Brown | H01R 13/523 | 439/271 |
| 2016/0240973 | A1 * | 8/2016 | Zieman | H01R 13/6315 | |
| 2017/0271817 | A1 | 9/2017 | Pickel et al. | | |
| 2019/0109397 | A1 * | 4/2019 | Sugiura | H01R 13/17 | |
| 2021/0384674 | A1 * | 12/2021 | Frasch | H01R 24/86 | |
| 2021/0408739 | A1 * | 12/2021 | Ivancic | H01R 13/622 | |

OTHER PUBLICATIONS

Micro-Mode, MMSP-8300, https://micromode.com/product/mmsp-8300/, to the best of applicant's knowledge article was available before the application filing date, 5 pages, El Cajon, CA.

SV Microwave, Inc., SMP R/A Cable Jack for 0.086 S.R. Cable, Customer Drawing, May 21, 2004, 1 page, Drawing No. 1214-4001.

* cited by examiner

SELF-ALIGNING RADIO FREQUENCY CONNECTOR

BACKGROUND

Rigid radio frequency ("RF") connectors are often used to connect various devices. Such connectors can be known by various names such as "bullets" (a connector/adaptor with two female ends) or "barrels" (a connector/adaptor with two male ends). Such connectors can have various sizes, lengths, and types of connections based on a given application.

An example of a rigid, RF connector and a connection system is shown in FIGS. 1A-1D. In this example, an exemplary RF connector 10 in the form of an RF bullet is shown having a rigid, cylindrical body 100. The rigid body 100 comprises a first connection end 102 and a second connection end 104. In this example, the connection ends 102, 104 comprise female type of connectors or connector configurations/interfaces and the first connection end 102 can be spring loaded. Other RF connectors are also known that can have male type connectors or connector configurations/interfaces (e.g. a barrel connector), or a male type and a female type connector or connector configuration/interface. Further, RF connectors can take on different widths, lengths, configurations, and/or shapes than the example shown here.

In some uses of a rigid, RF connector, the first connection end (e.g., see first connection end 102 of RF connector 10) can be selectively attachable and detachable to a first device (e.g., see first device 120) and the second connection end (e.g., see second connection end 104 of RF bullet 10) can be selectively attachable and detachable to a second device 130. However, when one of the connection ends is connected to one of the devices, the RF connector may not be aligned with the other one of the devices. For example, with the first connection end 102 connected to the first device 120, the second connection end 104 can be out of alignment with the second device 130 due to an off-axis connection with the first device 120 (see FIG. 1B). This can be even more problematic in the event of a blind connection of the RF connector 10 to the second device 130 where the RF connector 10 passes over or through a structural member prior to connection (e.g., see spacer 150, where the RF connector 10 passes through an aperture 152 (thru-hole) in the spacer 150), where a user cannot directly manipulate the RF connector 10 into the blind connection.

While one or more of the first and second devices 120, 130 may have the ability to receive the unaligned RF connector 10, the resulting unaligned interface increases the likelihood of damage to the RF connector 10 and/or to the first and second devices 120, 130. It has been found that such damage can include tines or other pieces of the RF connector 10 breaking off of the RF connector 10. In some applications, these broken pieces of the RF connector (sometimes referred to as foreign object debris or "FOD") can be detrimental as they can interfere with or damage the components and/or system in which the RF connector 10 is used.

Accordingly, it is preferable to align the RF connector 10 with the second device 130 prior to attempting to connect the second connection end 104 with the second device 130 (see FIG. 10). This helps prevent, or at least minimize, damage to the RF connector 10 and the generation of FOD associated with a damaged RF connector 10.

In light of the above, various objects or mechanisms have been implemented to attempt to align an RF connector with a device to facilitate a clean blind connection. However, such mechanisms have fallen short. Some examples include an O-ring that has been added over the RF connector at the first connection end of the RF connector to attempt to align the RF connector with the second device. However, it has been found that such O-rings positioned or disposed about the RF connector at or proximate an end location are insufficient to provide the force necessary to properly align the RF connector. Other examples include an interference fit gasket positioned or disposed at or proximate one or both of ends of the RF connector. However, due to the radial extending configuration of the gasket relative to the RF connector, the gasket aligns the RF connector too strongly (the gasket does not accommodate off-axis positions or orientations of the RF connector) such that the RF connector cannot be properly engaged when the devices and/or a spacer or other device/object between the devices are somewhat offset from one another. Thus, the interference fit does not allow sufficient offset tolerances between the devices.

It should also be noted that solutions for aligning the RF connector should allow for connection even when the devices to be connected are offset from a nominal position. For example, see FIG. 1D showing the first and second devices 120, 130 offset relative to the spacer 150. In order for the RF connector 10 to be connected to both the first device 120 and the second device 130, the RF connector 10 is shown as needing to be positioned at a maximum offset position directly adjacent an inner surface 154 of the aperture 152 of the spacer 150. Accordingly, any solution to place the RF connector into nominal alignment should preferably also allow for a situation such as shown in FIG. 1D where the devices 120, 130 and/or spacer are offset from the nominal position.

Thus, there is a need to facilitate nominal alignment of an RF connector with a the devices to which it is connected to, while also allowing for various offsets in tolerances between the devices to be connected and any other structural members (e.g. spacer 150).

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 10 illustrates a section view of the RF connector of FIG. 1B in an aligned state relative to the first and second devices.

Figure 1A:
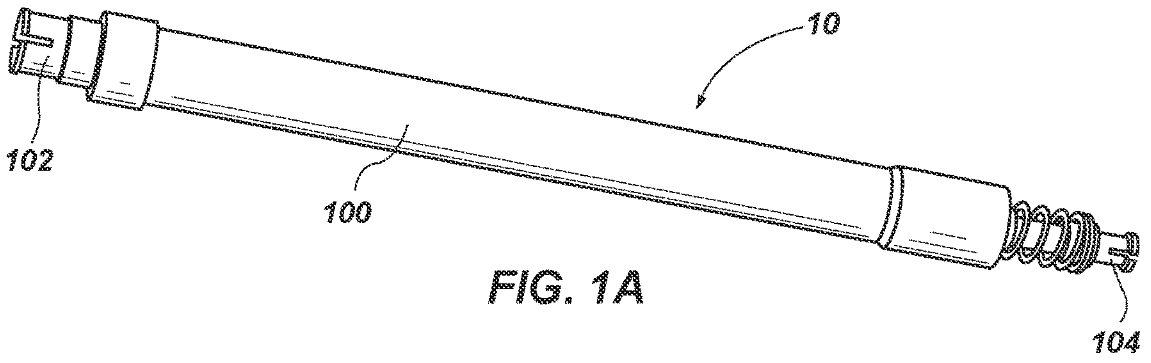
FIG. 1A illustrates an isometric view of an exemplary rigid RF connector.

Reference will now be made to the examples illustrated, and specific language will be used herein to describe the same. It will nevertheless be understood that no limitation of the scope of the invention is thereby intended.

DETAILED DESCRIPTION

As used herein, the term “substantially” refers to the complete or nearly complete extent or degree of an action, characteristic, property, state, structure, item, or result. For example, an object that is “substantially” enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of “substantially” is equally applicable when used in a negative connotation to refer to the complete or near complete lack of an action, characteristic, property, state, structure, item, or result.

As used herein, “adjacent” refers to the proximity of two structures or elements. Particularly, elements that are identified as being “adjacent” may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

The present disclosure sets forth a rigid, self-aligning radio frequency (“RF”) connector. According to one example, the RF connector can comprise a rigid body comprising a first connection end and a second connection end opposite the first connection end. The RF connector can also comprise a recess disposed on an outer surface of the rigid body between the first connection end and the second connection end, and a collapsible connector support.

The collapsible connector support can comprise a connection portion and a collapsible portion. The collapsible connector support can be disposed within and protrude from the recess while also being configured to collapse into the recess. The collapsible connector support can also be configured to interface with an interfacing surface to facilitate generation of a reaction force. The reaction force can be sufficient to support at least a portion of a mass of the RF connector relative to the interfacing surface. When the first connection end is connected to a first device, the reaction force facilitated or provided by the collapsible connector support can nominally align the second connection end with a second device. As used herein, a nominal position or a nominal alignment refers to a planned or designated position or alignment where an actual position or alignment can vary from the planned or designated alignment.

In an example, the collapsible portion can comprise a protruding state and a collapsed state. The connection portion can be secured to a surface of the recess, and the collapsible portion can be configured to collapse into the recess.

In an example, the recess can comprise a stop configured to prevent longitudinal motion of the connection portion that is secured to the surface of the recess.

In an example, the rigid body can comprise a substantially cylindrical shape. The recess can comprises an annular configuration.

In an example, the collapsible connector support can comprise a flared O-ring supported within the recess. The collapsible portion can comprise a flared portion of the flared O-ring extending both radially outward and longitudinally away from the connection portion. The flared portion can be compliant and configured to collapse into the recess.

In an example, the collapsible connector support can comprise a hollow-core O-ring disposed within the recess. The hollow-core O-ring can be configured to flatten into the recess.

In an example, the collapsible connector support can comprise a half-moon O-ring. The half-moon O-ring can comprise first and second ends that define the connection portion secured to a surface of the recess and an arced portion that defines the collapsible portion protruding from and configured to collapse within the recess.

In an example, the collapsible connector support can comprise a d-shaped O-ring. The d-shaped O-ring can comprise a flat side that defines the connection portion secured to a surface of the recess. The d-shaped O-ring can also comprise an arced portion extending from the flat side that defines the collapsible portion protruding from and configured to collapse within the recess.

In an example, the collapsible connector support comprises an acute angle O-ring. The acute angle O-ring can comprise a base portion that defines the connection portion secured to a surface of the recess. The acute angle O-ring can also comprise an acute angled extension extending from the base portion that defines the collapsible portion protruding from and configured to collapse within the recess.

In an example, collapsible connector support can comprise a v-ring. The v-ring can comprise two angled members extending from the connection portion. The two angled members can define the collapsible portion protruding from and configured to collapse within the recess.

In an example, the collapsible connector support comprises a caret shaped ring. The caret shaped ring can comprise two ends defining the connection portion secured to a surface the recess. The caret shaped ring can also comprise an inverted v shape extending from the two ends defining the collapsible portion protruding from and configured to collapse within the recess.

The present disclosure further sets forth a system to facilitate a blind connection of a rigid, radio frequency ("RF") connector from a first device to a second device. In an example, the system can comprise an RF connector. The RF connector can comprise a rigid body, a first connection end configured to selectively connect to and disconnect from the first device, and a second connection end opposite the first connection end configured to selectively connect to and disconnect from the second device.

The system can comprise a structural support member (e.g., a spacer) disposed or positioned between the first and second devices. The structural support member can comprise an interfacing surface adjacent the rigid body of the RF connector.

The system can comprise a recess disposed on one of an outer surface of the rigid body of the RF connector or on the interfacing surface of the structural support member. The system can also comprise a collapsible connector support. The collapsible connector support can comprise a connection portion and a collapsible portion. The collapsible connector support can be disposed within and protrude from the recess while being configured to collapse into the recess. The collapsible connector support can be configured to facilitate generation of a reaction force to support the RF connector in an offset position relative to the interfacing surface.

In an example, with the first and second devices offset a maximum offset distance relative to one another, the RF connector is forced to be seated against the interfacing surface, such that the collapsible portion collapses to be completely within the recess.

In an example, upon connection of the first connection end to the first device, the reaction force provided by the collapsible connector support can nominally align the second connection end with the second device.

In an example, the collapsible connector support comprises a protruding state and a collapsed state.

In an example, the connection portion can be secured to a surface of the recess, and the collapsible portion can be configured to collapse into the recess.

In an example, the recess can comprise a stop that can be configured to prevent longitudinal motion of the connection portion secured to the surface of the recess.

In an example, the rigid body can comprise a substantially cylindrical shape, the interfacing surface can comprise an inner surface of an aperture formed in the structural support member where the rigid body can be configured to be inserted into and extend through the aperture, and the recess can comprise an annular configuration.

In an example, the collapsible connector support can comprise a flared O-ring supported within the recess. The collapsible portion can comprise a flared portion of the flared O-ring extending both radially outward and longitudinally away from the connection portion. The flared portion can be compliant and configured to collapse into the recess.

In an example the collapsible connector support can comprise a hollow-core O-ring disposed within the recess. The hollow-core O-ring can be configured to flatten into the recess.

In an example, the collapsible connector support can comprise a half-moon O-ring. The half-moon O-ring can comprise first and second ends that define the connection portion secured to a surface of the recess and an arced portion that defines the collapsible portion protruding from and configured to collapse within the recess.

In an example, the collapsible connector support can comprise a d-shaped O-ring. The d-shaped O-ring can comprise a flat side that defines the connection portion secured to a surface of the recess. The d-shaped O-ring can also comprise an arced portion extending from the flat side that defines the collapsible portion protruding from and configured to collapse within the recess.

In an example, the collapsible connector support comprises an acute angle O-ring. The acute angle O-ring can comprise a base portion that defines the connection portion secured to a surface of the recess. The acute angle O-ring can also comprise an acute angled extension extending from the base portion that defines the collapsible portion protruding from and configured to collapse within the recess.

In an example, collapsible connector support can comprise a v-ring. The v-ring can comprise two angled members extending from the connection portion. The two angled members can define the collapsible portion protruding from and configured to collapse within the recess.

In an example, the collapsible connector support comprises a caret shaped ring. The caret shaped ring can comprise two ends defining the connection portion secured to a surface the recess. The caret shaped ring can also comprise an inverted v shape extending from the two ends defining the collapsible portion protruding from and configured to collapse within the recess.

In an example the recess can be disposed on the outer surface of the rigid body of the RF connector between the first connection end and the second connection end.

In an example, the recess can be disposed on the inner surface of the aperture.

The present disclosure further sets forth a method for facilitating connection of a rigid, radio frequency ("RF") connector between a first device and a second device. In an example, the method can comprise connecting a first connection end of a rigid body of an RF connector to the first device, positioning the rigid body of the RF connector adjacent an interfacing surface of a structural support member (e.g., a spacer) disposed or positioned between the first device and the second device, and supporting the rigid body of the RF connector relative to the interfacing surface of the structural support member.

The RF connector can be supported by a reaction force provided by a collapsible connector support. The collapsible connector support can comprise a connection portion and a collapsible portion. The collapsible connector support can be disposed within and protrude from a recess disposed on one of an outer surface of the rigid body of the RF connector or the interfacing surface of the structural support member. The collapsible connector support can be configured to collapse into the recess. The method can further comprise connecting a second connection end of the rigid body of the RF connector to the second device.

In an example, the method can further comprise, with the first and second devices offset relative to one another, causing the collapsible portion adjacent the interfacing surface to collapse completely within the recess.

In an example, upon connection of the first connection end to the first device, the reaction force provided by the collapsible connector support can nominally align the second connection end with the second device.

In an example, the collapsible portion can be configured to provide the reaction force in a protruding state and can be configured to collapse into the recess in a collapsed state.

In an example, the connection portion can be secured to a surface of the recess, and the collapsible portion can be configured to collapse into the recess.

In an example, the recess can comprise a stop that can be configured to prevent longitudinal motion of the connection portion secured to the surface of the recess.

In an example, the rigid body can comprise a substantially cylindrical shape, the interfacing surface can comprise an inner surface of an aperture formed in the spacer where the rigid body can be configured to extend through the aperture, and the recess can comprise an annular configuration.

In an example, the collapsible connector support can comprise a flared O-ring supported within the recess. The collapsible portion can comprise a flared portion of the flared O-ring extending both radially outward and longitudinally away from the connection portion. The flared portion can be compliant and configured to collapse into the recess.

In an example the collapsible connector support can comprise a hollow-core O-ring disposed within the recess. The hollow-core O-ring can be configured to flatten into the recess.

In an example, the collapsible connector support can comprise a half-moon O-ring. The half-moon O-ring can comprise first and second ends that define the connection portion secured to a surface of the recess and an arced portion that defines the collapsible portion protruding from and configured to collapse within the recess.

In an example, the collapsible connector support can comprise a d-shaped O-ring. The d-shaped O-ring can comprise a flat side that defines the connection portion secured to a surface of the recess. The d-shaped O-ring can also comprise an arced portion extending from the flat side that defines the collapsible portion protruding from and configured to collapse within the recess.

In an example, the collapsible connector support comprises an acute angle O-ring. The acute angle O-ring can comprise a base portion that defines the connection portion secured to a surface of the recess. The acute angle O-ring can also comprise an acute angled extension extending from the base portion that defines the collapsible portion protruding from and configured to collapse within the recess.

In an example, collapsible connector support can comprise a v-ring. The v-ring can comprise two angled members extending from the connection portion. The two angled members can define the collapsible portion protruding from and configured to collapse within the recess.

In an example, the collapsible connector support comprises a caret shaped ring. The caret shaped ring can comprise two ends defining the connection portion secured to a surface the recess. The caret shaped ring can also comprise an inverted v shape extending from the two ends defining the collapsible portion protruding from and configured to collapse within the recess.

In an example the recess can be disposed on the outer surface of the rigid body of the RF connector between the first connection end and the second connection end.

In an example, the recess can be disposed on the inner surface of the aperture.

Figure 1B:
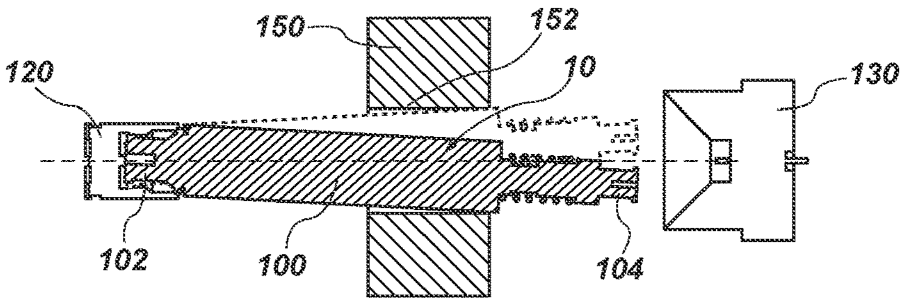
FIG. 1B illustrates a section view of a rigid RF connector, a spacer, and a first and second device to be connected with the RF connector where the RF connector is misaligned.
Figure 1C:
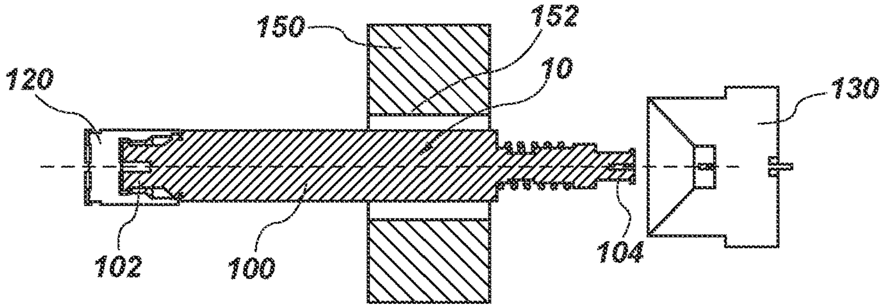
FIG. 1D illustrates a section view showing the offset tolerances of the spacer and the first and second devices of FIG. 1B.
Figure 1D:
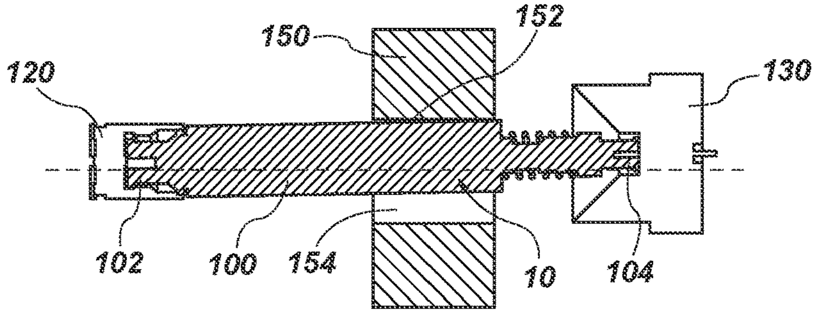
Figure 2A:
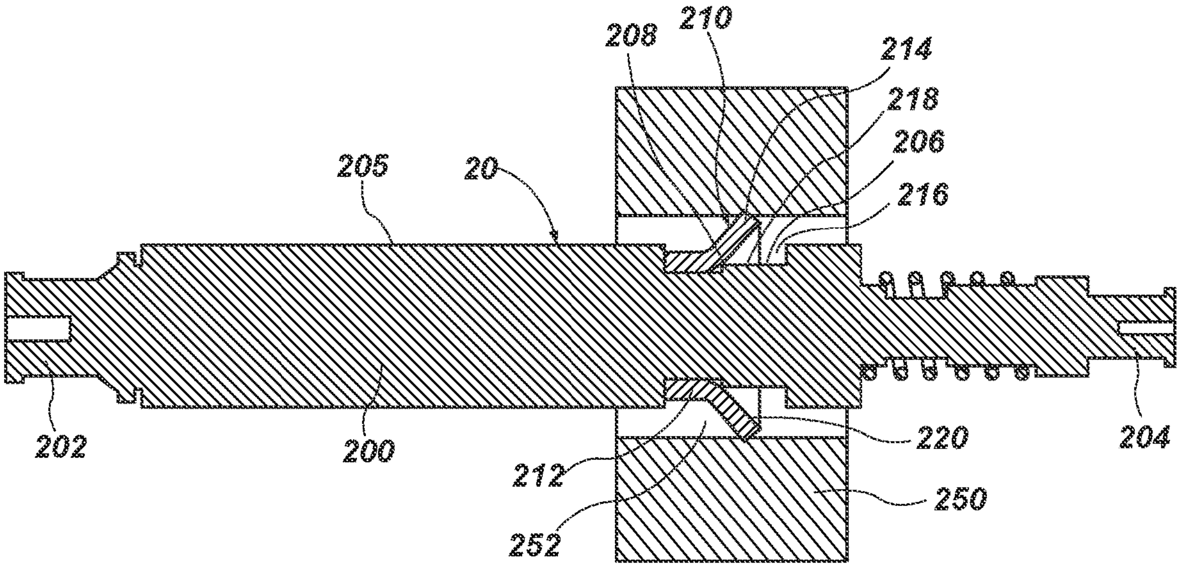
FIG. 2A illustrates a partial section view of an RF connector and a collapsible connector support in the form of a flared O-ring secured to the RF connector, the flared O-ring being shown in a protruded state in accordance with an example of the present disclosure.

To further describe the present technology, examples are now provided with reference to the figures. FIG. 2A illustrates a section view of an RF connector and a collapsible connector support in a protruding state (the state of the collapsible connector support with the RF connector in a nominal alignment position) as secured to the RF connector in accordance with an example of the present disclosure. In FIG. 2A, a rigid, RF connector 20 includes a rigid body 200. In this example, the rigid body 200 is substantially cylindrical and comprises a first connection end 202 and second connection end 204 opposite the first connection end 202. The RF connector 20 can be configured to connect to a first device and a second device, such as first and second devices 120, 130 (see FIGS. 1B-1D). Examples of first and second devices that an RF connector can connect to include, but are not limited to a Transmit/Receive RF Module and an RF Radiating Element, a Transmit/Receive RF Module and a RF power divider/combiner, two separate RF power divider/combiners, and a RF module blind-mating with a panel mount cable/connector.

The rigid body 200 can be formed of any material suitable for an RF connector. For example the rigid body 200 can be formed from a metallic material such as brass, copper, stainless steel, aluminum, or an alloy of one or more of these materials. Though not shown, the RF connector 20 can comprise a conductive core formed from a conductive material such as copper, brass, or alloys thereof that facilitates the relaying of signals transferred through the RF connector 20 from the first connection end 202 to the second connection end and vice versa. While the rigid body 200 shown in FIG. 2A is cylindrical, other shapes can also be used, such as an RF connector with a square or rectangular cross-section.

The RF connector 20 can comprise a recess 206 located between the first end 202 and the second end 204 of the RF connector 20 so as to be offset from a pivot point of the RF connector 20 generated about one of the ends of the RF connector 20 once that end is connected to the first or second device (with the other end not yet connected). In one example, the recess 206 can be disposed at or proximate a midpoint of the RF connector 20. In the example shown in FIG. 2A, the recess 206 can comprises an annular configuration in the form of a groove formed in a portion of an outermost surface 205 of the rigid body 200 that extends circumferentially around the rigid body 200. However, the recess 206 can take on different shapes and sizes and configurations other than that shown in FIG. 2A. For example, in another embodiment, a recess can be defined by spaced apart protruding members that extend circumferentially around the RF connector 20. In other words, the recess does not necessarily have to be formed into the rigid body 200.

In another aspect, the RF connector 20 can comprise a plurality of different recesses at different locations on or about the rigid body 200 of the RF connector 20. These can comprise longitudinally configured recesses, circumferentially configured recesses, or a combination of these.

The RF connector 20 can further comprise, and the recess 206 can be configured to receive and accommodate, a collapsible connector support 210 configured to nominally align the RF connector 20 with one or more devices to which it is intended to be connected (such as first and/or second device 120, 130 discussed above) while still allowing the RF connector 20 to maintain a proper connection when the devices to which the RF connector is connected are misaligned or offset. The collapsible connector support 210 can be configured to be secured within the recess 206, and to protrude outward from the recess 206 above the outermost surface(s) 205 of the rigid body 200 a desired distance. Further, the collapsible connector support 210 can be configured to mash, pivot, fold, bend, deflect, or otherwise collapse into the recess 206, such that the collapsible connector support 210 resides fully within the recess 206 below the outermost surface(s) 205 of the RF connector 20. As such, the recess 206 can be sized and configured to provide a clearance for the collapsible connector support 210 in a direction that the collapsible connector support 210 collapses or otherwise deflects down into the recess 206. As will be explained in more detail below, the configuration of the collapsible connector support 210 can be formed in a variety of configurations.

The collapsible connector support 210 in FIG. 2A can be an O-ring that has a flared profile. The collapsible connector support 210 can be termed a flared O-ring. The collapsible connector support 210 in the form of the flared O-ring can comprise a connecting portion 212 and a collapsible portion 214. The connecting portion 212 can be configured to be secured to or otherwise supported by or about one more surfaces of the recess 206. In the example shown, the connecting portion 212 is secured to a lower longitudinal surface of the recess 206, as well as to a wall of the recess 206.

The collapsible connector support 210 can be secured to the rigid body 200 of the RF connector 20 within the recess 206 using any known means or method, such as via an adhesive, an interference fit, or a combination of these.

The collapsible connector support 210 in the form of the flared O-ring can be formed from an elastomeric material such as silicon elastic or other now known or later developed materials. The elastomeric material makeup can facilitate placement of the collapsible connector support 210 in the recess 206 by stretching the collapsible connector support 210 over the rigid body 200 of the RF connector 20 and pulling the collapsible connector support 210 along the rigid body 200 and into the recess 206 where the connecting portion 212 contracts into the recess 206, such that the collapsible connector support 210 is supported by the rigid body 200 of the RF connector 20 within the recess 206.

The elastomeric material can comprise a durometer sufficient to cause the collapsible portion 214 to provide an aligning force to the rigid body 200 of the RF connector, as well as to collapse fully into the recess 206 where little to no aligning force is provided by the collapsible connector support.

As shown in FIG. 2A, the recess 206 can comprise one or more stops, such as stop 208. In one example, as shown, the stop 208 can be in the form of a stepped portion in the recess 206. However, other structures or features formed as part of the recess or added into the recess may also be used as a stop (e.g., one or more nubs, fins, rails, adhesives, and others as will be apparent to those skilled in the art). The stop 208 can interface with the collapsible connector support 210 to aid in restricting longitudinal or other motion of the collapsible connector support 210 once it is placed into position in the recess 206.

The collapsible connector support 210 can be configured to be used in association with an interfacing surface 252 of a structure or object (a structural support member) positioned between the connection portions of the first and second devices to be connected by the RF connector 20. In one example, as shown, the structural support member can be a spacer 250 within an RF network system. The spacer 250 can be a separate object disposed between the devices to be connected or it can be an extension of or connected to one or both of the devices to be connected by the RF connector 20. The interfacing surface 252 can be disposed adjacent to the rigid body 200 of the RF connector 20. As shown in FIG. 2A, the interfacing surface 252 can comprise the inner surface of an aperture formed through the spacer 250 through which the RF connector 20 extends. The aperture can be sized and configured to facilitate movement (multi-axis translational and multi-axis rotational) of the RF connector 20, such that at maximum offsets and misalignments (worst-case offsets) the RF connector 20 is still able to connect with the first and second devices. It is noted herein that the interfacing surface does not have to comprise or be defined by a thru-aperture. Indeed, other interfacing surface configurations are contemplated herein, and thus, a thru-aperture is not intended to be limiting in any way. For example, a structural member or object can be of a type other than a spacer, with the interface surface of the structural member or object being an open, planar interfacing surface.

Furthermore, the collapsible connector support 210 on the RF connector 20 can be sized and configured such that at the nominal position, the outer edges of the connector support 210 contact the interfacing surface 252 of the thru-aperture in the spacer 250, thus functioning to center the connector support 210 within the aperture. Indeed, the collapsible portion 214 of the collapsible connector support 210 can interface with the interfacing surface 252 to support the RF connector 20 in a positon relative to the spacer 250, and to provide nominal alignment of the rigid body 200 of the RF connector 20 with a device to which the RF connector initially or first connects. For example, when the RF connector 20 is inserted through the aperture and the rigid body 200 of the RF connector is within and adjacent to the interfacing surface 252, the collapsible portion 214 of the collapsible connector support 210 protruding from the recess 206 is caused to come into contact with the interfacing surface 252 depending upon the position and orientation of the RF connector 20 relative to the interfacing surface 252 of the spacer 250. Indeed, the collapsible portion 214 is sized and configured to extend from the RF connector 20 to the interfacing surface 250. The resilient nature of the elastomeric material of the collapsible connector support 210 and the interaction of the connector support 210 with the interfacing surface 252 provides a reaction force countering the force from the weight or mass of the RF connector 200, which allows the collapsible connector support 210 to support the RF connector 20 in a centered and aligned nominal position relative to the spacer 250 and the device to which it is to be connected. In other words, the RF connector 20 is supported laterally (and in this case radially) within the aperture of the spacer 250, such that the RF connector 20 is supported a distance from the interfacing surface 252 of the spacer 250 where the RF connector 20 is centered within the aperture. Moreover, the collapsible connector support 210 can be configured (i.e., its size, shape, configuration, material makeup, and durometer can be tuned or configured) so that it does not deflect under the weight of the RF connector 20 itself.

In the example shown in FIG. 2A where the interfacing surface 252 is an inner surface of an aperture and the collapsible connector support 210 is a flared or other type of O-ring device as discussed herein, the collapsible connector support 210 and its interaction with the interfacing surface 252 can generate a 360 degree reaction force radially in all directions that functions to center the RF connector 20 within the aperture to align the RF connector 20. This provides a nominal alignment with the aperture and the devices to be connected to the RF connector 20 to facilitate an aligned connection and to prevent damage to the devices and/or the RF connector.

In the example where the collapsible connector support 210 is a flared O-ring, such as the flared O-ring shown in FIG. 2A, the makeup and configuration of the flared O-ring can be such that the reaction force generated by the flared O-ring to align the RF connector 20 allows the collapsible connector support 210 support the RF connector 20 in an offset position relative to the interfacing surface 252 and to align the RF connector 20 with a device to be connected, but is insufficient to cause the collapsible connector support 210 collapse into the recess 206 under only the weight of the RF connector 20. With the RF connector 20 centered within the aperture in a nominal alignment position relative to the device to be connected, damage to the RF connector 20 can be prevented or at least minimized during a connection process. This reduces the likelihood of FOD from a damaged RF connector 20, which increases the safety and reliability of the RF connector 20 and/or an application utilizing the RF connector 20.

As indicated above, the collapsible connector support 210 can be advantageously located between the first connection end 202 and the second connection end 204 of the RF connector 20. The collapsible connector support 210 can more reliably align the RF connector 200 when it is disposed away from the connection ends 202, 204. In one example, the collapsible connector support 210 can be disposed at least one eighth of a length of the RF connector 20 away from each of the connection ends 202, 204. In another example, the collapsible connector support 210 can be disposed at least one fourth of a length of the RF connector 20 away from each of the connection ends 202, 204. In still another example, the collapsible connector support 210 can be disposed at or near/proximate a midpoint of the RF connector 20. The distance the connector support 210 is away from an end of the RF connector 20 can vary depending upon the application. Suffice it to say that, unlike the prior related alignment means or mechanisms discussed above located about the connection ends of a RF connector, it is intended that the collapsible connector supports (and the associated recesses) discussed herein be positioned down or away from the connection ends 202, 204 and from the structural connection portion(s) (e.g., connection portions of devices 120, 130 of FIGS. 1B-1D) of the devices connected by the RF connector 20 that are configured to receive the connection ends 202, 204 of the RF connector 20.

In some instances, the devices to be connected may not be in nominal alignment with one another. Specifically, the devices may be offset from a nominal position while still being within allowed tolerances to achieve connection via the RF connector 20. One advantage of the RF connector 20 and collapsible connector support 210 is that the collapsible connector support 210 can not only place the RF connector 20 into nominal alignment and maintain this as the RF connector 20 is being connected, but it can also deflect to any position between fully extended and or collapsed to allow for those situations where the devices are offset from the nominal position within the allowed tolerances. This is discussed in more detail below.

Figure 2B:
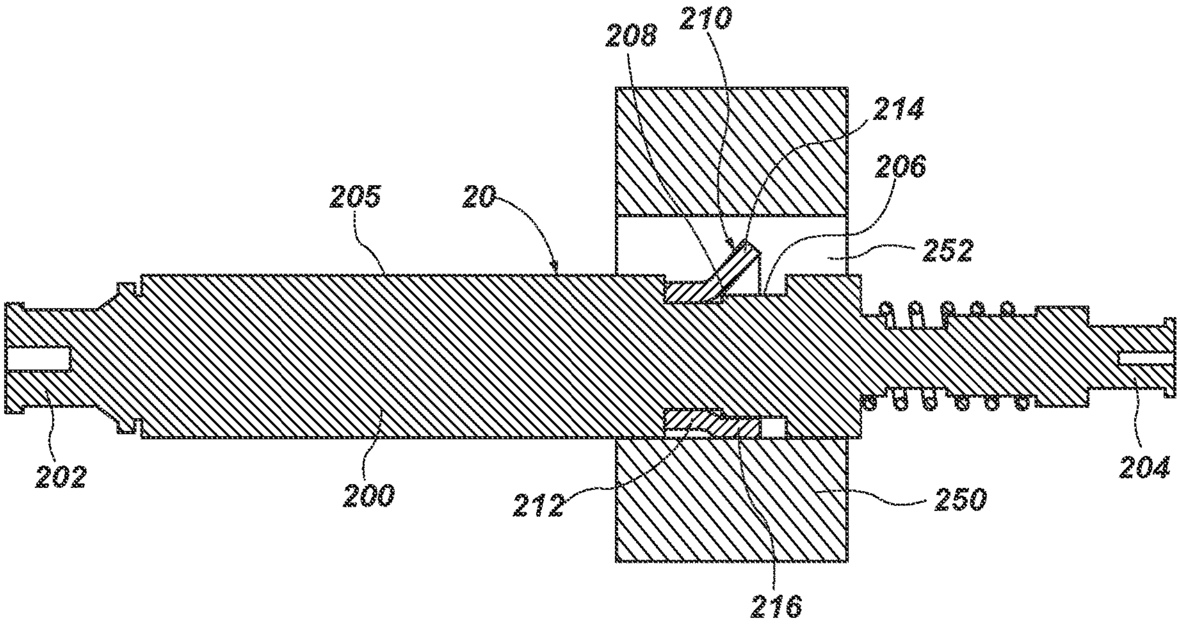
FIG. 2B illustrates a partial section view of the RF connector and the collapsible connector support of FIG. 2A, the flared O-ring being shown in a fully collapsed state.

FIG. 2B illustrates a partial section view of the RF connector 20 with the collapsible connector support 210 in a fully collapsed state in accordance with an example of the present disclosure. The rigid body 200 of the RF connector 20 is shown to be directly adjacent a portion of the interfacing surface 252 with a portion of the outer surface of the rigid body 200 being seated against the interfacing surface 252. This particular position and orientation of the RF connector 20 can represent a maximum offset (a worst case offset) and can be caused when the devices (not shown) to which the RF connector 20 is connected are offset a maximum amount from a nominal position while still being within acceptable connection tolerances. Although the RF connector 20 is shown being offset laterally at a zero angle relative to the first and second devices due to the first and second devices being offset the same distance from the nominal position and relative to the spacer 250, the RF connector 20 can also be offset and oriented angularly (i.e., the RF connector 20 can comprise an angular offset) in the event the first and second devices are offset at different distances from the nominal position and relative to the spacer 250. Moreover, the collapsed state of the collapsible connector support 210 can comprise instances where the collapsible connector support 210 is partially collapsed, such as will be the case when the RF connector 20 is forced in a direction towards the interfacing surface some distance between a nominal alignment position and a maximum offset position. Even in a partially collapsed state, the collapsible connector support 210 can still provide or facilitate generation of a reaction force.

In this example, a part 216 of the collapsible portion 214 adjacent the interfacing surface 252 is caused to collapse completely within the recess 206. Indeed, the recess 206 is advantageously designed to include a space into which the collapsible portion 214 collapses in the event of a large enough offset of the RF connector 20 from a nominal position. For example, in the event of a maximum offset of the RF connector 20, the part 216 of the collapsible portion 214 adjacent the interfacing surface 252 can completely collapse into the recess 206 such that no part of the collapsible connector support 210 extends above the outermost surface of the rigid body 200 of the RF connector in contact with the interfacing surface 252. That is, the part 216 of the collapsible portion 214 collapses such that the part 216 is below an envelope defined by the outer surface of the rigid body 200. In the example of the flared O-ring as the collapsible connector support 210, the collapsible member 214 is a flared part extending longitudinally away and radially outward from the connecting portion 212. The collapsible member 214 can comprise a length and flare angle, such that a volume of space 217 is formed between the lower surface 218 of the recess 206 and the inner surface 220 of the collapsible member 214 into which the collapsible member 214 can collapse. The flared nature of the collapsible connector support 210, along with its elastomeric makeup, creates a pivot point or fulcrum in the collapsible connector support 210 at the intersection of the connecting portion 212 and the collapsible portion 214 that allows the collapsible portion to pivot or deflect downward (i.e., collapse) into the volume of space and into the recess 206. Thus, the part 216 of the collapsible portion 214 can completely collapse into the recess 206 allowing the rigid body 200 of the RF connector 20 to be directly adjacent the interfacing surface 252. This allows the collapsible connector support 210 to both nominally align the RF connector 20 and to allow offsets in the positions of the devices to be connected that are within acceptable connection tolerances.

The collapsible connector support 210 can be sized and configured such that the forces exerted on the RF connector 20 by the collapsible connector support 210 are as non-impactful as possible, meaning that the collapsible connector support 210 can be designed so that it does not disrupt or adversely impact the connection process. Indeed, forces and stresses can be tailored to different applications and different RF connectors by varying the configuration (e.g., material makeup, durometer, size, etc.) of the collapsible connector support 210. For example, in the case of an RF connector in the form of a RF spring bullet and a collapsible connector support in the form of a silicone flared O-ring operable with the RF spring bullet and having a Shore A hardness of 65, radial and axial forces acting on the RF spring bullet from the flared O-ring during initial insertion into a connector portion of a first device (e.g., a radiating element connector) are less than 1.0 lb. (between 0.20 and 0.5 lb. radial forces, and between 00.05 and 0.2 lb. axial forces). Moreover, with the RF spring bullet at a maximum offset position with the flared O-ring at maximum compression (i.e., fully collapsed into the recess) radial and axial forces are also less than 1.0 lb. (between 0.5 and 0.80 lb. radial forces, and between 0.3 and 0.5 lb. axial forces), with between 160 and 180 psi stress in the collapsible connector support 210. Of course, this is only an example, and not to be limiting in any way as other configurations of RF connectors and associated collapsible connector supports are contemplated herein. In any event, it is intended that the collapsible connector support associated with an RF connector have as negligible negative impact on the RF connector as possible.

When the connector on the second device is of a catcher's mitt style (such as the second device 130 shown in FIG. 1B-1D), having a substantially conical recess, the connector is able to "catch" the second end 204 (the free end) of the RF connector 20 and guide it into a mating position. The axial insertion force applied to the second device and the substantially conical shape of its connector exert a radial force on the RF connector 20, counteracting the reaction force of the collapsible connector support 210, forcing the collapsible connector support into a partially or fully compressed state. Current RF connectors are sufficiently stiff and strong to apply much greater forces on the collapsible connector support 20 than are required to nominally align the RF connector 20 prior to connection of the second device, thereby allowing a system design that nominally positions the RF connector 20 when the second device is absent, but allows sufficient compliance to mate both ends 202, 204 of the RF connector 20 to the first and second devices without damage to any components.

Referring to FIGS. 2A and 2B, an exemplary method for connecting two devices (such as devices 120, 130 shown in FIGS. 1B-1D) with a rigid, RF connector will be described. In operation, the RF connector 20 is connected to a first device at a first connection end 202. Prior to or after connecting the first connection end, the rigid body 200 of the RF connector 20 is placed adjacent to the interfacing surface 252. For example, the RF connector 20 may be inserted through an aperture in the spacer 252 and connected at the first connection end 202 to a first device.

The stop 208 in the recess 206 can prevent any longitudinal motion of the collapsible connector support 210 relative to the outer surface of the rigid body of the RF connector 20 while the RF connector 20 is moved into position relative to the interfacing surface 252 (e.g. while the RF connector 20 is inserted into the aperture). The orientation (e.g., flare angle in the event of a flared O-ring) of the collapsible portion 214 of the collapsible connector support 210 can also be configured to prevent longitudinal movement of the collapsible connector support 210 with respect to the surface of the rigid body.

With the rigid body 200 of the RF connector 20 adjacent to the interfacing surface 252, the collapsible connector support 210 nominally aligns the RF connector 20 relative to the interfacing surface 252 and the second device to be connected. In the example shown in FIG. 2A, the collapsible connector support 210 centers the RF connector 20 within the aperture 252 of the spacer 250. However, as discussed above, the interfacing surface does not have to comprise or be defined by an aperture. Indeed, other interfacing surface configurations are contemplated herein, and thus, a thru-aperture is not intended to be limiting in any way.

With the RF connector 20 in nominal alignment, the RF connector 20 is connected to the second device. Advantageously, if an offset of the devices to be connected exists, and/or the interfacing surface 252 are such that the RF connector 20 is forced out of nominal alignment position (e.g., at a maximum offset or something between the nominal alignment position and a maximum offset position), the part 216 of the collapsible member 214 of the collapsible connector support 210 adjacent to the interfacing surface 252 collapses some degree and potentially into the recess 206 in the event of a maximum offset, thus facilitating the connection.

Thus, in the above described method, the RF connector 20 can be both nominally aligned or centered with the devices to be connected while also facilitating a connection where the RF connector 20 is forced in a direction towards the interfacing surface 252 due to acceptable offsets between the devices and/or the interfacing surface 252.

The RF connector 20 with the collapsible connector support 210 in the form of a flared O-ring is but one possible geometry for the collapsible connector support 210. Other geometries and sizes can be used, examples of which are discussed in more detail below.

Figure 3A:
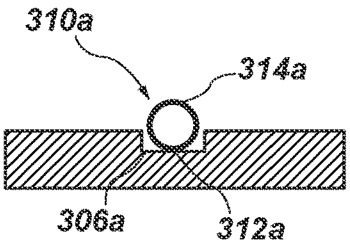
FIG. 3A illustrates a partial section view of an RF connector and a collapsible connector support in the form of an exemplary hollow-core shaped O-ring, according to an example of the present disclosure.

FIG. 3A illustrates a partial section view of an RF connector and a collapsible connector support comprising an exemplary hollow-core shaped O-ring according to an example of the present disclosure. As shown in FIG. 3A, a collapsible connector support 310*a* can comprise an O-ring having a hollow core. A first side 312*a* of the hollow core can be disposed on the recess 306*a* and defines the connecting portion of the collapsible connector support 310*a*. A second side 314*a* protrudes from the recess 306*a* and can be configured to collapse within the recess 306*a*. Thus the second side 314*a* can define the collapsible portion of the collapsible connector support 310*a*.

Figure 3B:
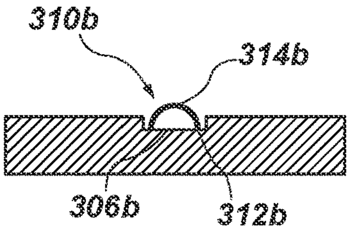
FIG. 3B illustrates a partial section view of an RF connector and a collapsible connector support in the form of an exemplary semi-circular shaped (C-shaped or half-moon) O-ring, according to an example of the present disclosure.

FIG. 3B illustrates a section view of an RF connector and a collapsible connector support comprising an exemplary half-moon shaped O-ring shape according to an example of the present disclosure. As shown in FIG. 3B, a collapsible connector support 310*b* can comprise an O-ring having a half-moon or semi-circular arced shape. Ends 312*b* of the half-moon shape can be disposed in the recess 306*b* and define the connecting portion of the collapsible connector support 310*b*. The arced portion 314*b* protrudes from the recess 306*b* and can be configured to collapse within the recess 306*b*. Thus the arced portion 314*b* can define the collapsible portion of the collapsible connector support 310*b*.

Figure 3C:
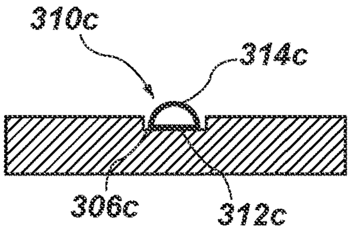
FIG. 3C illustrates a partial section view of an RF connector and a collapsible connector support in the form of an exemplary D-shaped O-ring, according to an example of the present disclosure.

FIG. 3C illustrates a section view of an RF connector and a collapsible connector support comprising an exemplary D-shaped O-ring according to an example of the present disclosure. As shown in FIG. 3C, a collapsible connector support 310*c* can comprise an O-ring having a D-shape. A base 312*b* of the D-shape can be disposed in the recess 306*b* and define the connecting portion of the collapsible connector support 310*b*. The arced portion 314*c* protrudes from the recess 306*c* and can be configured to collapse within the recess 306*c*. Thus the arced portion 314*c* can define the collapsible portion of the collapsible connector support 310*c*.

Figure 3D:
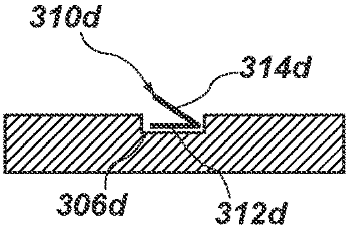
FIG. 3D illustrates a partial section view of an RF connector and a collapsible connector support in the form of an exemplary acute angle shaped O-ring, according to an example of the present disclosure.

FIG. 3D illustrates a section view of an RF connector and a collapsible connector support comprising an exemplary acute angle shaped O-ring according to an example of the present disclosure. As shown in FIG. 3D, a collapsible connector support 310*d* can comprise an O-ring having an acute angle shape. A base 312*d* of the acute angle can be disposed in the recess 306*d* and define the connecting portion of the collapsible connector support 310*d*. The acute angled portion 314*d* protrudes from the recess 306*d* and can be configured to collapse within the recess 306*d*. Thus the acute angled portion 314*d* can define the collapsible portion of the collapsible connector support 310*d*.

Figure 3E:
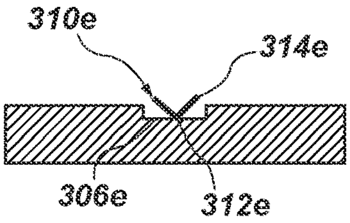
FIG. 3E illustrates a partial section view of an RF connector and a collapsible connector support in the form of an exemplary V-shaped O-ring, according to an example of the present disclosure.

FIG. 3E illustrates a section view of an RF connector and a collapsible connector support comprising an exemplary V-shaped O-ring according to an example of the present disclosure. As shown in FIG. 3E, a collapsible connector support 310*e* can comprise an O-ring having a V-shape. A base 312*e* of the V-shape can be disposed in the recess 306*e* and define the connecting portion of the collapsible connector support 310*e*. The extending portions 314*e* protrude from the recess 306*e* and can be configured to collapse within the recess 306*e*. Thus the extending portions 314*e* can define the collapsible portion of the collapsible connector support 310*e*.

Figure 3F:
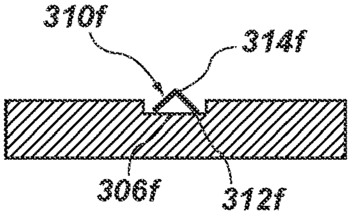
FIG. 3F illustrates a partial section view of an RF connector and a collapsible connector support in the form of an exemplary caret shaped O-ring, according to an example of the present disclosure.

FIG. 3F illustrates a section view of an RF connector and a collapsible connector support comprising an exemplary caret shaped O-ring according to an example of the present disclosure. As shown in FIG. 3F, a collapsible connector support 310*f* can comprise an O-ring having a caret shape. Ends 312*f* of the caret shape can be disposed in the recess 306*f* and define the connecting portion of the collapsible connector support 310*f*. The pointed portion 314*f* protrudes from the recess 306*f* and can be configured to collapse within the recess 306*f*. Thus the pointed portion 314*f* can define the collapsible portion of the collapsible connector support 310*f*.

Several advantages are provided by the rigid, self-aligning RF connectors discussed herein, some of which are discussed below, and some of which will be apparent to those skilled in the art. For instance, the RF connector with a collapsible connector support disposed on a recess of the RF connector provides a reliable way to nominally align the RF connector with one or more devices to be connected to the RF connector. The collapsible connector support still facilitates offsets from the nominal position of the devices to be connected by at least a part of the collapsible connector support collapsing into the recess when the RF connector is forced to displace in a direction towards the interfacing surface. Further, the collapsible connector support can be disposed away from the connection ends of the RF connector allowing for reliable aligning of the RF connector. As another recognized advantage, although the RF connector can be collapsible as described above, the RF connector can still facilitate generation of a sufficient reaction force to support and align the RF connector for nominal positioning of the devices to be connected.

Figure 4:
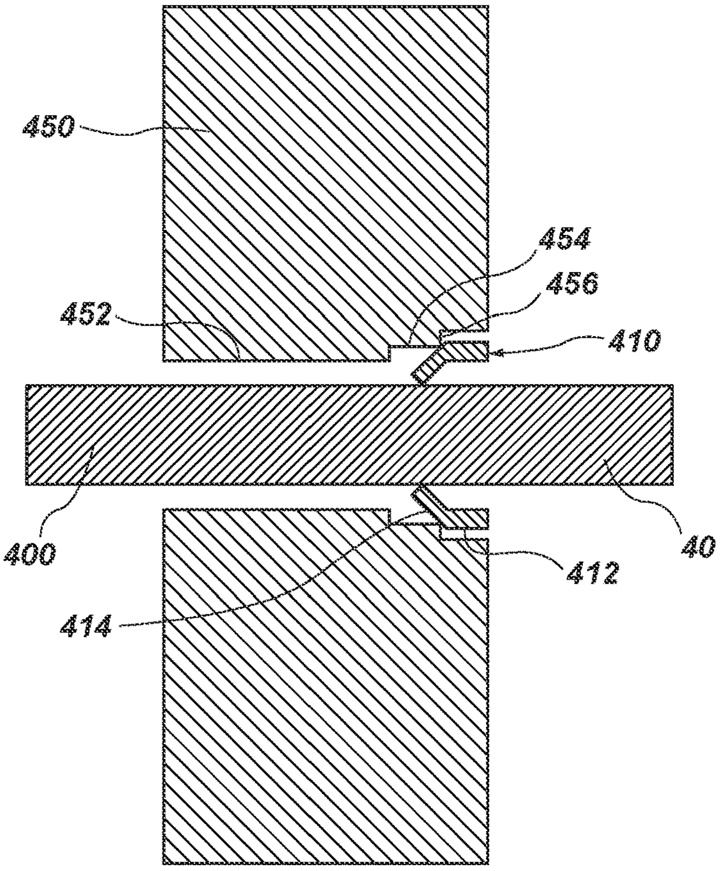
FIG. 4 illustrates a section view of a system for an RF connector and a collapsible connector support disposed on and protruding from a surface (e.g., a recess surface) of a spacer, according to an example of the present disclosure.

In the above examples, the collapsible connector support is described as being secured to the RF connector. However, in an alternative example, the collapsible connector support can be secured to the interfacing surface rather than to the RF connector. FIG. 4 illustrates a section view of an RF connector and a collapsible connector support disposed in and protruding from a recess on a spacer, according to an example of the present disclosure. In FIG. 4, an RF connector 40 is provided with a rigid body 400 that extends adjacent to an interfacing surface 452 of a spacer 450. In this example, the interfacing surface 452 is an inner surface of an aperture of the spacer 450.

The interfacing surface 452 comprises a recess 454. A collapsible connector support 410 can be disposed within the recess 454 in a similar manner as taught herein. The collapsible connector support 410 can comprise a connection portion 412 that is configured to be secured to the recess 454. The collapsible connector support 410 can further comprise a collapsible portion 414 configured to extend from the recess 454 to provide an aligning force against the RF connector 40, and to collapse into the recess 454. The recess can further comprise a stop 456 to prevent longitudinal motion of the collapsible connector support 410 relative to the interfacing surface 452.

The collapsible connector support 410 operates similar to the collapsible connector support 210 described above, and thus a full description will be omitted for brevity. Further, different geometries may be used for the collapsible connector support 410 such as geometries similar to those shown in FIGS. 3A-3F. Similar advantages may be obtained with the RF connector 40, interfacing surface 452 and collapsible connector support 410 as described above.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A rigid, self-aligning radio frequency ("RF") connector comprising:

a rigid body having a substantially cylindrical configuration, and comprising a first connection end configured to selectively connect to and disconnect from a first device and a second connection end opposite the first connection end and configured to selectively connect to and disconnect from a second device;

a recess disposed on an outer surface of the rigid body between the first connection end and the second connection end and comprising an annular configuration; and a collapsible connector support comprising a connection portion and a collapsible portion, the collapsible connector support being disposed within and protruding from the recess, and being configured to collapse into the recess, wherein the collapsible connector support is configured to interface with an interfacing surface to facilitate generation of a reaction force sufficient to support the RF connector in an offset position relative to the interfacing surface wherein the collapsible connector support comprises a flared O-ring supported within the recess, the collapsible portion comprising a compliant flared portion of the flared O-ring extending both radially outward and longitudinally away from the connection portion.

2. The RF connector of claim 1, wherein, upon connection of the first connection end to a first device, the reaction force facilitated by the collapsible connector support nominally aligns the second connection end with a second device.

3. The RF connector of claim 1, wherein the collapsible portion comprises a protruding state and a collapsed state.

4. The RF connector of claim 1, wherein the connection portion is secured to a surface of the recess, and wherein the collapsible portion is configured to collapse into the recess.

5. The RF connector of claim 4, wherein the recess comprises a stop configured to prevent longitudinal motion of the connection portion secured to the surface of the recess.

6. The RF connector of claim 1, wherein the collapsible connector support comprises a flared O-ring supported within the recess, the collapsible portion comprising a flared portion of the flared O-ring extending both radially outward and longitudinally away from the connection portion, the flared portion being compliant and configured to collapse into the recess.

7. The RF connector of claim 1, wherein the collapsible connector support comprises a hollow-core O-ring disposed within the recess, the hollow-core O-ring being configured to flatten into the recess.

8. The RF connector of claim 1, wherein the collapsible connector support comprises a half-moon O-ring comprising first and second ends that define the connection portion secured to a surface of the recess and an arced portion that defines the collapsible portion protruding from and configured to collapse within the recess.

9. The RF connector of claim 1, wherein the collapsible connector support comprises a d-shaped O-ring comprising a flat side that defines the connection portion secured to a surface of the recess and an arced portion extending from the flat side that defines the collapsible portion protruding from and configured to collapse within the recess.

10. The RF connector of claim 1, wherein the collapsible connector support comprises an acute angle O-ring comprising a base portion that defines the connection portion secured to a surface of the recess and an acute angled extension extending from the base portion that defines the collapsible portion protruding from and configured to collapse within the recess.

11. The RF connector of claim 1, wherein the collapsible connector support comprises a V-ring comprising two angled members extending from the connection portion, the two angled members defining the collapsible portion protruding from and configured to collapse within the recess.

12. The RF connector of claim 1, wherein the collapsible connector support comprises a caret shaped ring comprising two ends defining the connection portion secured to a surface the recess and an inverted v shape extending from the two ends defining the collapsible portion protruding from and configured to collapse within the recess.

13. A system to facilitate a blind connection of a rigid, radio frequency ("RF") connector from a first device to a second device, the system comprising:

a RF connector comprising a rigid body comprising a first connection end configured to selectively connect to and disconnect from the first device, and a second connection end opposite the first connection end configured to selectively connect to and disconnect from the second device to provide RF communication between the first device and the second device;

a structural support member positioned between the first and second devices, the structural support member comprising an interfacing surface configured to be adjacent to the rigid body of the RF connector, and comprising an inner surface of an aperture formed in the structural support member, the rigid body being configured to be inserted through the aperture;

a recess comprising a substantially rigid member and an annular configuration, and disposed on an outer surface of the rigid body of the RF connector; and a collapsible connector support comprising a connection portion and a collapsible portion, the collapsible connector support being disposed within and protruding from the recess, and being configured to collapse into the recess, wherein the collapsible connector support is configured to facilitate generation of a reaction force to support the RF connector in an offset position relative to the interfacing surface, wherein the collapsible connector support comprises at least one of a flared O-ring, a hollow core O-ring, a C-shaped O-ring, a D-shaped O-ring, an acute angle O-ring, a V-ring, or a caret shaped ring.

14. The system of claim 13 wherein, with the first and second devices offset a maximum offset distance relative to one another, the RF connector is forced to be seated against the interfacing surface, such that the collapsible portion collapses to be completely within the recess.

15. The system of claim 13, wherein, upon connection of the first connection end to the first device, the reaction force provided by the collapsible connector support nominally aligns the second connection end with the second device.

16. The system of claim 13, wherein the collapsible connector support comprises a protruding state and a collapsed state.

17. The system of claim 13, wherein the connection portion is secured to a surface of the recess, and wherein the collapsible portion is configured to collapse into the recess.

18. The system of claim 17, wherein the recess comprises a stop configured to prevent longitudinal motion of the connection portion secured to the surface of the recess.

19. The system of claim 13, wherein the recess is disposed on the outer surface of the rigid body of the RF connector between the first connection end and the second connection end.

20. The system of claim 13, wherein the recess is disposed on the inner surface of the aperture.

21. A method for facilitating connection of a rigid, radio frequency ("RF") connector between a first device and a second device, the method comprising:

connecting a first connection end of a rigid body of an RF connector to the first device, the rigid body comprising a substantially cylindrical configuration;

positioning the rigid body of the RF connector adjacent an interfacing surface of structural support member positioned between the first device and the second device;

supporting the rigid body of the RF connector relative to the interfacing surface of the structural support member via a reaction force generated by a collapsible connector support, the collapsible connector support comprising a connection portion and a collapsible portion, the collapsible connector support being disposed within and protruding from a recess having an annular configuration and disposed on an outer surface of the rigid body of the RF connector, the collapsible connector support being configured to collapse into the recess and the recess being disposed between the first connection end and the second connection end; and connecting a second connection end of the rigid body of the RF connector to the second device to provide RF communication between the first device and the second device, wherein the collapsible connector support comprises a flared O-ring supported within the recess, the collapsible portion comprising a compliant flared portion of the flared O-ring extending both radially outward and longitudinally away from the connection portion.

22. The method of claim 21, further comprising, with the first and second devices offset relative to one another, causing the collapsible portion adjacent the interfacing surface to collapse completely within the recess.

23. A rigid, self-aligning radio frequency ("RF") connector comprising:

a rigid body comprising a first connection end and a second connection end opposite the first connection end;

a recess disposed on an outer surface of the rigid body between the first connection end and the second connection end; and a collapsible connector support comprising a connection portion and a collapsible portion, the collapsible connector support being disposed within and protruding from the recess, and being configured to collapse into the recess, wherein the collapsible connector support is configured to interface with an interfacing surface to facilitate generation of a reaction force sufficient to support the RF connector in an offset position relative to the interfacing surface;

wherein the rigid body comprises a substantially cylindrical shape, and wherein the recess comprises an annular configuration, and wherein the collapsible connector support comprises a flared O-ring supported within the recess, the collapsible portion comprising a flared portion of the flared O-ring extending both radially outward and longitudinally away from the connection portion, the flared portion being compliant and configured to collapse into the recess.

24. A system to facilitate a blind connection of a rigid, radio frequency ("RF") connector from a first device to a second device, the system comprising:

a RF connector comprising a rigid body comprising a substantially cylindrical shape, a first connection end configured to selectively connect to and disconnect from the first device, and a second connection end opposite the first connection end configured to selectively connect to and disconnect from the second device;

a structural support member positioned between the first and second devices, the structural support member comprising an interfacing surface configured to be adjacent to the rigid body of the RF connector;

a recess comprising an annular configuration and being disposed on one of an outer surface of the rigid body of the RF connector or on the interfacing surface of the structural support member, the interface surface comprising an inner surface of an aperture formed in the structural support member, the rigid body being configured to be inserted through the aperture; and a collapsible connector support comprising a connection portion and a collapsible portion, the collapsible connector support being disposed within and protruding from the recess, and being configured to collapse into the recess, wherein the collapsible connector support is configured to facilitate generation of a reaction force to support the RF connector in an offset position relative to the interfacing surface; and wherein the collapsible connector support comprises one of a flared O-ring, a hollow core O-ring, a C-shaped O-ring, a D-shaped O-ring, an acute angle O-ring, a V-ring, a caret shaped ring.

25. A system to facilitate a blind connection of a rigid, radio frequency ("RF") connector from a first device to a second device, the system comprising:

a RF connector comprising a rigid body comprising a substantially cylindrical shape, a first connection end configured to selectively connect to and disconnect from the first device, and a second connection end opposite the first connection end configured to selectively connect to and disconnect from the second device;

a structural support member positioned between the first and second devices, the structural support member comprising an interfacing surface configured to be adjacent to the rigid body of the RF connector;

a recess comprising an annular configuration and being disposed on one of an outer surface of the rigid body of the RF connector or on the interfacing surface of the structural support member, the interfacing surface comprising an inner surface of an aperture formed in the structural support member, the rigid body being configured to be inserted through the aperture; and a collapsible connector support in the form of a flared O-ring comprising a connection portion and a collapsible portion, the collapsible connector support being disposed within and protruding from the recess, and being configured to collapse into the recess, wherein the collapsible connector support is configured to facilitate generation of a reaction force to support the RF connector in an offset position relative to the interfacing surface; and wherein the recess is disposed on the outer surface of the rigid body of the RF connector between the first connection end and the second connection end.

26. A system to facilitate a blind connection of a rigid, radio frequency ("RF") connector from a first device to a second device, the system comprising:

a RF connector comprising a rigid body comprising a substantially cylindrical shape, a first connection end configured to selectively connect to and disconnect from the first device, and a second connection end opposite the first connection end configured to selectively connect to and disconnect from the second device;

a structural support member positioned between the first and second devices, the structural support member comprising an interfacing surface configured to be adjacent to the rigid body of the RF connector;

a recess comprising an annular configuration and being disposed on one of an outer surface of the rigid body of the RF connector or on the interfacing surface of the structural support member, the interfacing surface comprising an inner surface of an aperture formed in the structural support member, the rigid body being configured to be inserted through the aperture; and a collapsible connector support in the form of a flared O-ring comprising a connection portion and a collapsible portion, the collapsible connector support being disposed within and protruding from the recess, and being configured to collapse into the recess, wherein the collapsible connector support is configured to facilitate generation of a reaction force to support the RF connector in an offset position relative to the interfacing surface; and wherein the recess is disposed on the inner surface of the aperture.

* * * * *